July 14, 1936.　　　G. A. TINNERMAN　　　2,047,298
FASTENER
Filed Aug. 10, 1934

Inventor
George A. Tinnerman
By Bates, Golrick, & Teare
Attorneys

Patented July 14, 1936

2,047,298

UNITED STATES PATENT OFFICE 2,047,298

FASTENER

George A. Tinnerman, Rocky River, Ohio, assignor to Albert H. Tinnerman, Cleveland, Ohio Application August 10, 1934, Serial No. 739,300

1 Claim. (Cl. 85—36)

This invention relates to spring fasteners, and particularly to those, which are adapted to be used as a sole means for engaging the shank of a bolt and cooperating therewith to lock two members together. Spring fasteners have heretofore been made from sheet metal and have included a base portion that has tongues projecting upwardly therefrom, and that are notched to engage the shank of a bolt.

Such tongues however, have engaged only one thread of the bolt, and although they have been extremely satisfactory for many uses, nevertheless, there are many instances, particularly in the automotive industry, where the heavy gauge metal and the misalignment thereof has necessitated a degree of tightness which would strip the thread of the bolt when only one thread is engaged. For example, in the radiator housing assembly the variation which occurs in the degree of hardness of the metal as the sheets are produced in the mill, causes the radiator shell flange to vary from the intended angle at which it is designed to engage a cooperating part. It is the function of the bolt and nut therefore, to pull the flange down at the time of assembly to the desired position; but experience has shown that the force which is required to do so has been sufficient to strip the thread, when only one is engaged.

An object of my invention therefore, is to retain the advantageous characteristic of a spring fastener, so as to obviate the necessity for a lock nut and at the same time to engage multiple threads on a bolt, so as to distribute the locking stresses over a greater area on the threads and thereby permit the bolt to be tightened within permissible limits without distorting or damaging any of the threads. This, therefore opens up a wide field of usefulness of spring fasteners.

In this connection, my invention is concerned with a spring fastener, which may be made without materially adding to the cost of fasteners, which normally engage only a single thread of a bolt.

Figure 1:
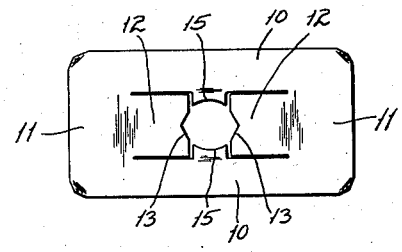
Figure 2:
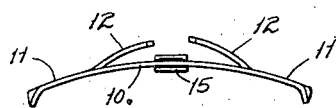
Figure 3:
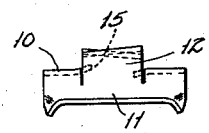
Figure 4:
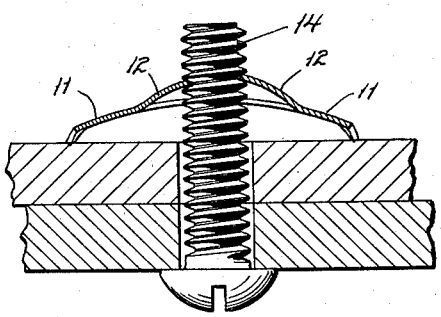
Figure 5:
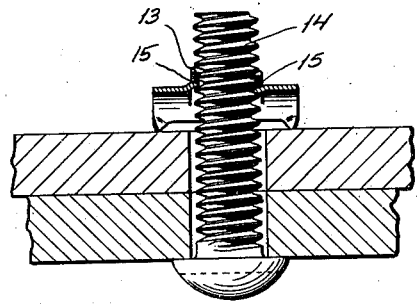

Referring now to the drawing, Fig. 1 is a top plan view of a fastener embodying my invention; Figs. 2 and 3 are side and end elevations, respectively, thereof; Fig. 4 is a longitudinal sectional view through the fastener when applied to the work, and Fig. 5 is a transverse section of the fastener shown in Fig. 4.

The fastener with which I have illustrated my invention, preferably comprises a sheet metal stamping that has a body which comprises longitudinal portions 10 that are connected at their ends by bridge portions 11. Tongues 12 are struck upwardly from the body portion adjacent the inner sides of the bridge portions 11 and are notched at 13 to receive the shank of a bolt, such as that indicated at 14. Additional tongues 15 extend inwardly from the longitudinal portions 10 and between the ends of the tongues 13. The inner edges of the tongues 15 are also suitably curved or notched to engage the threaded shank of the bolt 14.

Where the fastener is intended for use on a threaded bolt, it has the base portion preferably arched in a longitudinal direction, as is shown in Fig. 2 and it likewise has the tongues 12 arched so as to make the ends thereof extend substantially at right angles to the axis of the bolt. This has been found to be desirable in order to engage the shoulder, which is formed by a thread on the bolt. Moreover, the ends of the tongues are inclined slightly in opposite directions so as to conform to the helix of the thread with which it is intended to be used. The tongues 15 are relatively short, and yet, they likewise have the edges slightly tilted, so as to conform to the helix of the thread. It is to be noted however, that the tongues 15 are disposed beneath the ends of the tongues 12, a distance which conforms substantially to the pitch of the thread. Thus, the tongues 12 engage one thread while the tongues 15 engage a lower thread. Moreover, the direction of engagement of one set of tongues occurs at substantially right angles to that of the other set, wherefore, the locking stresses are uniformly distributed around the bolt and the liability of shearing the threads is thereby reduced to a minimum.

An important advantage of the present invention is the fact that the fastener has multiple thread engagement with a bolt, and yet it has the yieldable characteristics which make it desirable for use. This materially increased its value for production assembly purposes, and opens a field of usefulness which heretofore was restricted to nuts which would engage multiple threads.

I claim:—

A spring fastener having a four-sided portion which comprises longitudinally extending strips that are connected by end strips which engage the work to be joined, a pair cᵉ tongues extending upwardly from the inner edges of the end strips and extending lengthwise of the body, and having their opposing longitudinal edges in the same vertical plane, and another set of tongues integral with the body and projecting inwardly from the longitudinal strips and extending transversely of the body and beneath the longitudinally extending tongues, the transverse tongues being shorter and narrower than the longitudinally extending tongues, and the transverse tongues cooperating with the longitudinal tongues to engage the shank of a threaded bolt.

GEORGE A. TINNERMAN.